(12) United States Patent
Hillberg et al.

(10) Patent No.: US 8,613,104 B2
(45) Date of Patent: Dec. 17, 2013

(54) PROTECTED AND VIRTUAL INTERFACES FOR COM AGGREGATION

(75) Inventors: Michael John Hillberg, Beaux Arts Village, WA (US); Sujal S. Parikh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 442 days.

(21) Appl. No.: 12/977,106

(22) Filed: Dec. 23, 2010

(65) Prior Publication Data

US 2012/0167224 A1 Jun. 28, 2012

(51) Int. Cl.
*G06F 7/04* (2006.01)
(52) U.S. Cl.
USPC .......... 726/27; 726/28; 726/30; 726/7; 726/8; 726/15; 713/153; 713/168; 713/170; 713/182; 713/186

(58) Field of Classification Search
None
See application file for complete search history.

(56) References Cited

U.S. PATENT DOCUMENTS

| | | | |
|---|---|---|---|
| 6,658,491 B1 * | 12/2003 | Hawkinson et al. ......... | 719/331 |
| 7,500,252 B1 | 3/2009 | Angeline et al. | |
| 2005/0229186 A1 | 10/2005 | Mitchell et al. | |
| 2009/0144752 A1 | 6/2009 | Shneerson et al. | |

OTHER PUBLICATIONS

"New Object-Oriented Capabilities in VB.NET", Retrieved at << http://www.developerfusion.com/article/1047/new-objectoriented-capabilities-in-vbnet/4/ >>, Jul. 14, 2001, pp. 7.
"Harnessing User-Level Networking Architectures for Distributed Object", Retrieved at << http://www.usenix.org/publications/library/proceedings/usenix-nt98/full_papers/madukkarum/madukkarum_html/madukkarum.html >>, Aug. 1998, pp. 10.
Shepherd, George, "Which Framework Should You Use? Building ActiveX Controls with ATL and MFC", Retrieved at << http://msdn.microsoft.com/en-us/magazine/bb985028.aspx >>, Apr. 2000, pp. 10.
Bloch, Joshua, "Substitutes for Missing C Constructs", Retrieved at << http://java.sun.com/developer/Books/shiftintojava/page1.html >>, Retrieved Date: Oct. 12, 2010 , pp. 22.
"Thinking in Java, 3rd ed. Revision 4.0" Retrieved at << http://oopweb.com/Java/Documents/ThinkingInJava/Volume/TIJ310.htm >>, Retrieved Date: Oct. 12, 2010 , pp. 48.
"Aggregation", Retrieved at << http://msdn.microsoft.com/en-us/library/ms686558%28VS.85%29.aspx >>, Oct. 13, 2010, pp. 4.

* cited by examiner

*Primary Examiner* — Pramila Parthasarathy

(57) ABSTRACT

An outer COM object can be provided with privileged access to protected functionality in an inner COM object. An inner COM object can offer a custom protected interface to an outer COM object by creating a new inner internals COM object that is not available to a calling application or by creating a new extension IUnknown interface that can be used to access the protected content. An outer COM object can override behavior in an inner COM object. An inner COM object can offer access to custom behavior to an outer COM object by creating a new inner internals COM object that is not available to a calling application. The new inner internals COM object can implement a new interface that provides access to the customized (override) content or can create a new extension IUnknown interface that can be used to provide access to the customized (override) content.

20 Claims, 6 Drawing Sheets

PROTECTED AND VIRTUAL INTERFACES FOR COM AGGREGATION

BACKGROUND

An "object" in an object-oriented programming language is an encapsulated module of code and related data that is accessible to clients through interfaces accessing well-defined and controlled connection points, known as the object's methods and properties. A collection of objects can be created to perform the functions desired in a computer application.

Component Object Model (COM) is a binary interface standard for software componentry used to enable communication and dynamic object creation in any programming language that supports it. The term COM is often used in the software development world as an umbrella term that encompasses the OLE, OLE Automation, ActiveX®, COM+ and DCOM technologies. COM provides a language-neutral way of implementing objects so an object can be used in an environment different from the one in which it was created.

One mechanism that enables object reuse in COM is containment delegation. Containment delegation is a mechanism in which one object (the "outer" object) uses functionality of another object (the "inner" object) to provide interface implementations to the outer object's clients. The outer object "contains" the inner object. The outer object exposes interfaces to a client, but its implementation of some of those interface properties and methods explicitly delegates to the inner object's methods. Containment for an outer object can be implemented by the outer object creating the inner objects it uses; using its pointer to the inner object, a call to a method in the outer object generates a call to a method in the inner object.

COM aggregation is an extension to containment delegation of COM objects in which the outer object exposes interfaces from the inner object directly. That is, when a client of the outer object requests an interface, if the outer object does not have an implementation of that interface, it forwards the request to the inner object. If the inner object returns an interface, the outer object's client then makes method and property calls directly to that inner object. Note that the inner object can itself be an outer object to a third object, and might similarly forward the interface requests. The outer-most object is called the "controlling" object. If a client is interacting with an inner object and requests a new interface, the inner object forwards the request to the controlling object, so that the outer objects have an opportunity to answer a request before inner objects. This aggregation algorithm can be useful when the outer object delegates all calls to one of its interfaces to the same interface in the inner object. COM aggregation can avoid extra implementation overhead in the outer object in this case.

SUMMARY

COM aggregation does not define a pattern for the outer object to have protected access to some of the inner object's interfaces. For example, an inner object might have an interface which it wishes to expose to outer objects, but does not want to expose to the controlling object's clients. COM aggregation also does not define a pattern for an inner object to allow some of its method and property implementations to be overridden by an outer object. For example, an inner object might have a method with behavior for which it wishes to give an outer object the ability to provide alternate behavior.

An outer COM object can be provided with access to protected functionality in an inner COM object, functionality which is not exposed to the controlling object's client. In one approach, the inner COM object offers this protected interface to the outer COM object by providing the outer object with a new "protected" internal interface, which is separate from the standard inner interface that the outer object keeps in COM aggregation. As with all interfaces in COM, the protected internal interface can be used to request other interfaces. But whereas the standard inner interface that the outer object receives from the inner object can only be used to request non-protected ("public") interfaces, the protected internal interface can be used to request protected interfaces. The inner object refuses requests received at its standard inner interface for this protected internal interface. When the outer object delegates an interface request from the controlling object's client to the inner object, the delegated interface request is only sent to the standard inner interface, and therefore the controlling object's client is prevented from accessing protected interfaces. When an outer object wishes to access protected functionality, the outer object requests a protected interface from the protected internal interface. In an alternate approach, the inner object provides a single interface to the outer object as in standard COM aggregation, which is the internal interface. From that internal interface a request can be made for just public interfaces, and when the outer object delegates an interface request from the controlling object's client, it makes a request in that way. But that internal interface can also be used to request the inner object's protected interfaces, via a method on that interface which is dedicated to that purpose, which an outer object uses to request protected interfaces. The controlling object's client is not given access to protected interfaces.

An outer COM object can override behavior in an inner COM object. The inner object makes this capability possible by defining a new overriding interface for the purpose, and requesting the new overriding interface from the controlling object. This allows the controlling object, or some other outer object, to provide the requested interface. If no outer object implements this overriding interface, the interface request delegates back to the original inner object, such that the inner object ultimately invokes its own implementation. If the inner object intends for the override interface to be public (available to the controlling object's clients), a standard interface request is made. That is, when the inner object (or any other code) wishes to invoke an override method, it requests the interface from the controlling object using a standard interface request. The inner object can also make the override interface protected, as described in the previous paragraph. In this case, in one approach, the outer COM object provides a protected override internal interface to the inner object. When the inner object requests an override interface from the controlling object, the request is sent on the protected override internal interface. When an outer object delegates this interface request to an inner object, it does so using the inner object's protected internal interface, as described in the first approach of the previous paragraph. In an alternate approach, the outer object provides a single interface to the inner object as in the standard COM aggregation approach, which is an internal interface. From that interface a request can be made for either public interfaces or protected interfaces. When the inner object wishes to invoke an override method, it makes a request on this internal interface to the controlling object. When an outer object delegates this interface request to an inner object, it does so again using this internal interface, as described in the second approach of the previous paragraph.

This Summary is provided to introduce a selection of concepts in a simplified form that are further described below in the Detailed Description. This Summary is not intended to

DETAILED DESCRIPTION

Overview

Figure 1A:
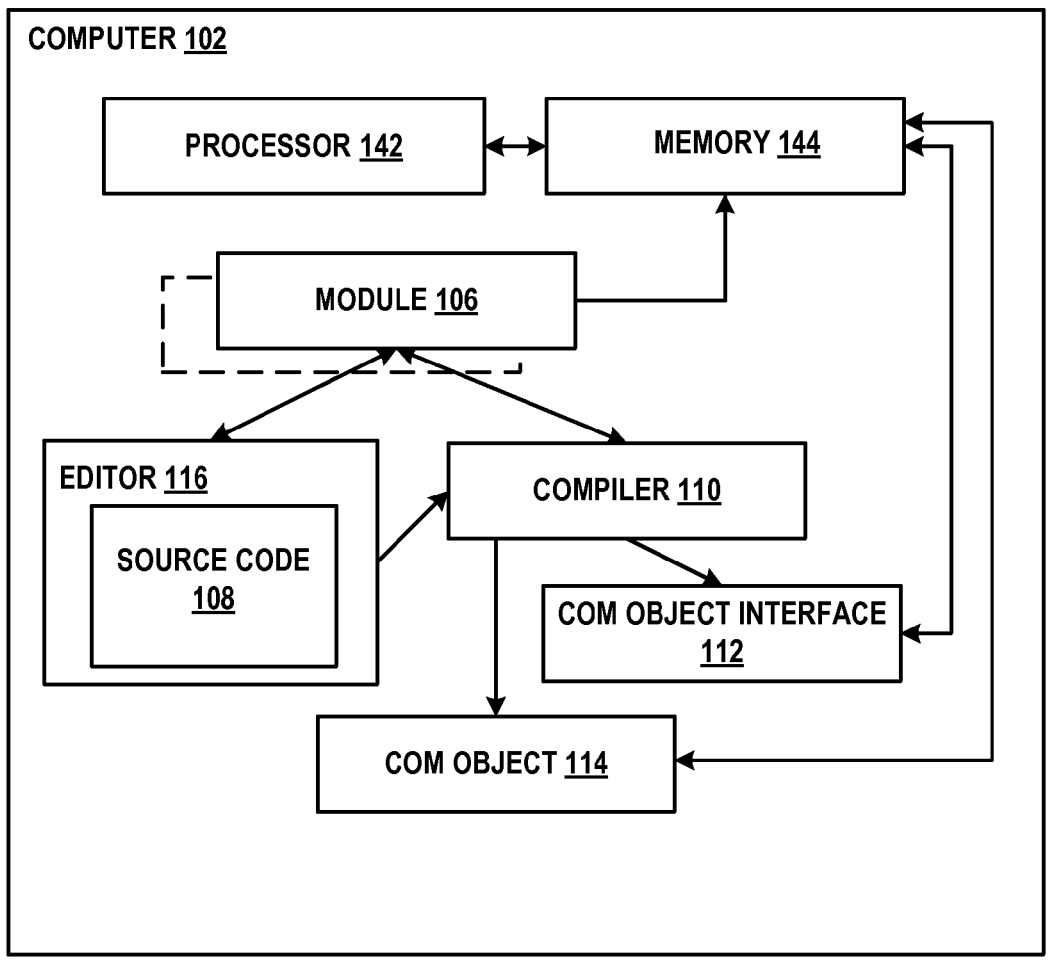
FIG. 1a illustrates an example of a system 100 for creating protected and/or virtual interfaces for COM aggregation in accordance with aspects of the subject matter disclosed herein.

COM objects implement an IUnknown interface, as well as other interfaces that implement the IUnknown interface methods. The IUnknown interface exposes three methods: QueryInterface, AddRef, and Release. QueryInterface is used to obtain a pointer to another interface, given an identifier called a GUID (globally unique identifier) that identifies the interface that is requested. AddRef is used by one or more clients (e.g., applications) to indicate that a COM object is being referenced. AddRef is incremented with each reference that is made so that a COM object is not removed prematurely. Release is used by a client to indicate that the client has finished using the COM object. An unreferenced COM object can be safely removed. Aggregation of COM objects uses a special "non-delegating" implementation of IUnknown on the inner object that forwards QueryInterface requests for unknown interfaces to its own inner object if present. Also, the IUnknown methods of any other interfaces on the inner object delegate to the "controlling" outer object's IUnknown methods. Traditional COM aggregation allows an object to create an inner object but does not describe a way for the outer (aggregator) COM object to have privileged access to protected functionality in the inner (aggregated) COM object. COM aggregation also does not describe a way for the outer object to override behavior of the inner object.

In accordance with aspects of the subject matter disclosed herein a mechanism is provided that allows an inner COM object to provide an outer COM object protected access to a subset of its functionality. The outer COM object can also receive callbacks from the inner COM object to override the inner object's behavior.

Protected and Virtual Interfaces for COM Aggregation

In some programming languages including C++, a base class can define protected and virtual members. A derived class can call the protected member, and can override the virtual member. This is illustrated in the following piece of code:

```
public class CButton
{
public:
    void Enable( ) { ... }
    void Disable( ) { ... }
protected:
    virtual void OnClick( )
    {
        ...
    }
    void SetButtonContent( char *content )
    {
    }
};
public class CMyButton
{
protected:
    void OnClick( ) // override
    {
        SetButtonContent( "Hello" );
        CButton::OnClick( );
    }
public:
    void Rotate( ) { ... }
};
```

In the C++ program code reproduced above there is a protected virtual method called OnClick on a class named CButton. When this CButton class' implementation determines by some means that it has been "pressed", it invokes the OnClick method. Since the CButton's OnClick method is virtual, and is overridden by an OnClick method in CMyButton, it is actually CMyButton's OnClick method which is invoked. The " . . . " in these method examples indicates that some other program instructions might be included there or might not. The CMyButton::OnClick can execute the code it wishes, including invoking the CButton::OnClick method which would have been invoked had it not been overridden by CMyButton. People that use C++ often refer to these two capabilities as "being able to override a virtual method" and "being able to call up to the base". Also shown in this example are two protected methods on CButton: OnClick and SetButtonContent. Since these methods have protected access, they are typically only invokable by code in the CButton class, or by code in a derived class such as CMyButton.

If this example is implemented using COM aggregation, there is presently no described way for an interface for the CButton object (e.g., an IButton interface) to keep the SetButtonContent method protected, and there is no way for an interface to a CMyButton object (e.g., that which implements the IMyButton interface) to override the CButton's OnClick method. In accordance with aspects of the subject matter disclosed herein, new COM interfaces are provided that enable implementation of protected methods and virtual methods in aggregated COM objects. It will be appreciated that in the example provided the virtual method is also a protected method but it will be appreciated that a virtual method can also be an unprotected method.

In the example, a COM implementation of these objects can have the following interfaces:

```
interfaceIButton : IUnknown
{
    void Enable( ) = 0;
    void Disable( ) = 0;
};
```

```
interface IButtonProtected : IUnknown
{
    void SetButtonContent( char *content );
};
interface IButtonOverride : IUnknown
{
    void OnClick( );
};
interface IMyButton : IUnknown
{
    void Rotate( );
};
```

Suppose CButton implements two interfaces, an unprotected interface IButton and a protected interface IButtonProtected, and a public or protected interface IButtonOverride. CButton can be implemented to call IButtonOverride when indicated. IButtonOverride can also be implemented by CMyButton. In accordance with aspects of the subject matter disclosed herein, implementation of the above can be accomplished by creating new interfaces via creation of new objects or by just creating new interfaces that are extensions to the IUknown interface.

FIG. 1a illustrates an example of a system 100 for creating protected and/or virtual interfaces for COM aggregation in accordance with aspects of the subject matter disclosed herein. All or portions of system 100 may reside on one or more computers such as the computers described below with respect to FIG. 3. All or portions of system 100 may reside on one or more software development computers such as the computers described below with respect to FIG. 4. The system 100 or portions thereof may comprise a portion of an integrated development environment (IDE) such as the ones described and illustrated below with respect to FIG. 4. Alternatively, system 100 can exist outside of an IDE. System 100 or portions thereof may be provided as a stand-alone system or as a plug-in or add-in.

System 100 may include one or more of a computer 102 comprising: a processor such as processor 142, a memory such as memory 144, and one or more modules such as module 106, etc. for creating protected and/or virtual interfaces for COM aggregation. Other components well known in the arts may also be included but are not here shown. It will be appreciated that one or more modules such as module 106, etc. (e.g., implementing the protected and/or virtual interfaces for COM aggregation) can be loaded into memory 144 to cause one or more processors such as processor 142 to perform the actions attributed to the one or more modules for creating protected and/or virtual interfaces for COM aggregation.

In operation, a developer can enter source code 108 into an editor 116 on which module 106, etc. acts to create one or more COM objects such as COM object 114 and/or one or more COM object interfaces such as COM object interface 112 as described more fully below. Module 106, etc. can be a module of compiler 110 or can be an add-in or can be separate from compiler 110. Module 106, etc. and/or compiler 110 can generate one or more COM objects such as COM object 114 and/or one or more COM object interfaces such as COM object interface 112. During runtime, COM objects and interfaces as described below can be generated dynamically.

Figure 1B:
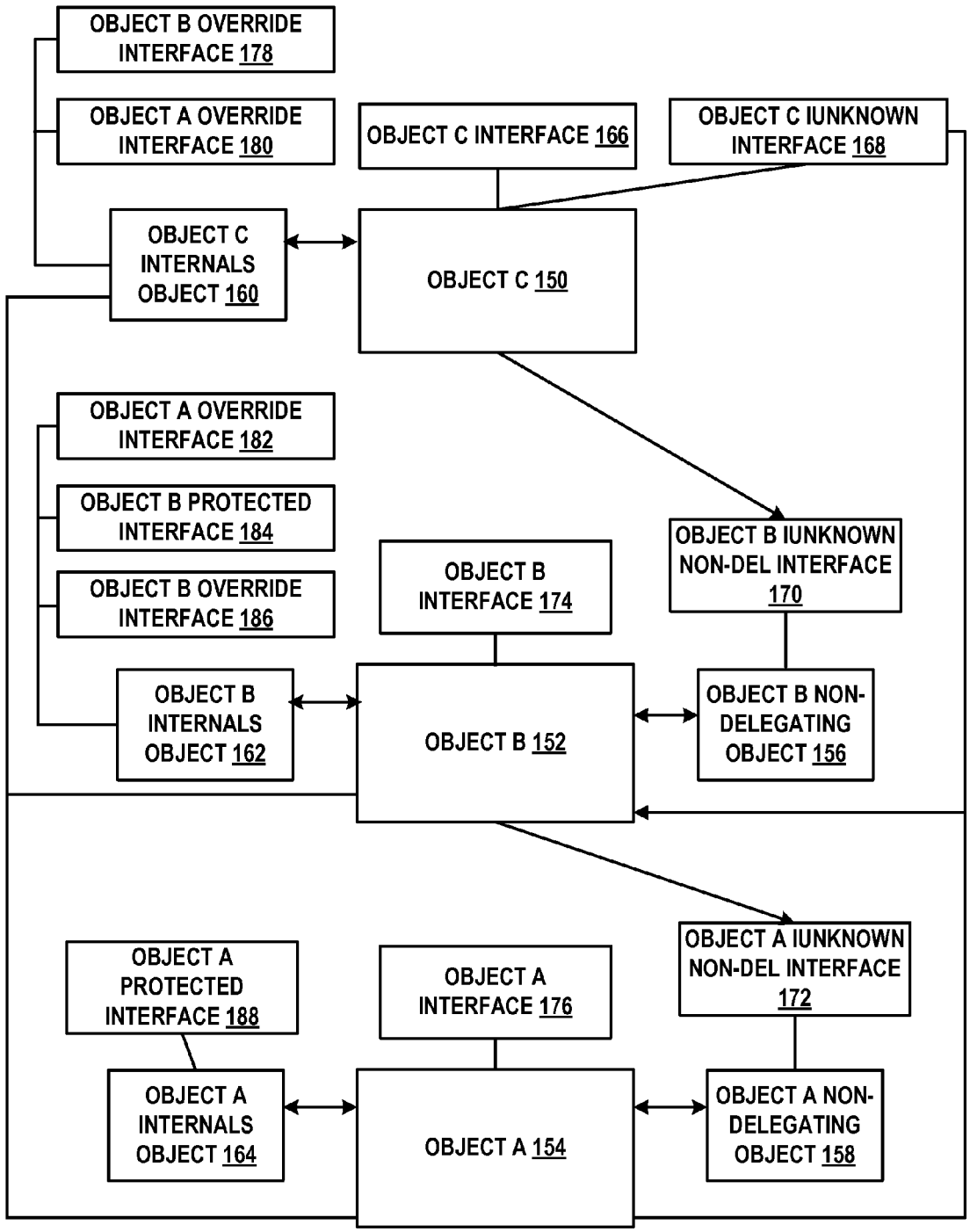
FIG. 1b illustrates an illustration of an example of a model for creating protected and/or virtual interfaces for COM aggregation in accordance with aspects of the subject matter disclosed herein.

FIG. 1b illustrates a separation-of-object approach to creation of protected and/or virtual interfaces for COM aggregation. In FIG. 1b COM Object A 154 (innermost object) is aggregated by a COM Object B 152. COM Object B 152 contains or aggregates COM Object A 154 and COM Object B 152 is contained by or is aggregated by COM Object C 150.

While three COM objects are shown in FIG. 1b, it will be appreciated that the subject matter described herein applies equally to two COM objects or to more than three COM objects. COM Object C 150 is an outer object to COM Object B 152 and COM Object B 152 is an outer object to COM Object A 154. Hence, COM Object B 152 is both an outer object and an inner object. COM Object A 154 is an inner object to COM Object B 152. COM Object B is an inner object to COM Object C 150. COM Object C 150 is the controlling object. COM Object C 150 exposes an interface ICOMObjectCInterface 166 and a controlling IUnknown interface, ICOMObjectCIUnknownInterface 168. COM Object B 152 exposes a delegating interface ICOMObjectBInterface 174 and a non-delegating IUnknown interface, ICOMObjectBNDIUnknownInterface 170. COM Object A 154 exposes a delegating interface ICOMObjectAInterface 176 and a non-delegating IUnknown interface, ICOMObjectANDIUnknownInterface 172. COM Object C 150 is the outermost object. The outermost object passes itself as the controlling unknown and the controlling internals.

In accordance with known COM aggregation capabilities, if a calling application calls the QueryInterface method on COM Object C 150's interface (e.g., on ICOMObjectCIUnknownInterface 168), requesting ICOMObjectBInterface, then the ICOMObjectBInterface 174 implemented by COM Object B 152 will be returned to the application. COM Object C 150 is able to call into COM Object B 152 using the non-delegating IUnknown interface, ICOMObjectBNDIUnknownInterface 170. This can happen because when COM Object C 150 created COM Object B 152, COM Object C 150 passed COM Object B 152 a controlling unknown object interface (ICOMObjectCIUnknownInterface 168). In response COM Object B 152 passed back to COM Object C 150 a non-delegating unknown interface, ICOMObjectBNDIUnknownInterface 170 of a non-delegating inner object, COM Object B ND Object 156. Moreover, if a calling application (the client of the controlling COM object, COM Object C 150) calls the QueryInterface method on an interface implemented by COM Object C 150, requesting an interface that the object does not implement, COM Object C 150 will issue a request for the interface to COM Object B 152 and if it does not implement the interface, COM Object B 152 will issue the request to COM Object A 154 asking for the interface. COM Object A 154 may return, for example, ICOMObjectAInterface 176 to COM Object B 152. COM Object B 152 may then return ICOMObjectAInterface 176 to COM Object C 150. This can happen because when COM Object B 152 created COM Object A 154, COM Object B 152 passed COM Object A 154 a controlling unknown interface ((ICOMObjectCIUnknownInterface 168). In response COM Object A 154 passed back to COM Object B 152 a non-delegating unknown interface, ICOMObjectANDIUnknownInterface 172 of a non-delegating inner object, COM Object A ND Object 158.

In accordance with aspects of the subject matter disclosed herein, when an outer COM object creates an inner COM object, in addition to passing the inner COM object a controlling unknown object, the outer COM object also passes a controlling internals object to the inner COM object. In response to receiving the controlling internals object, the inner COM object passes an inner internals object to the outer COM object. The controlling internals objects and the inner internals objects can implement protected interface(s) and/or protected override interface(s). If an object is created but is not passed a controlling internals object, the created object does not return an inner internals object.

For example, referring again to FIG. 1b, when COM Object C 150 creates COM Object B 152, in addition to passing COM Object B 152 a controlling unknown interface (e.g., ICOMObjectCIUnknownInterface 168), COM Object C 150 also passes to the COM Object B 152 a controlling internals interface, such as for example ICOMObjectAOverride 180, an IUnknown interface for COM Object C Internals Object 160, etc. In response, COM Object B 152 passes back to COM Object C 150 an inner internals interface for COM Object B Inner Internals Object 162, such as for example, ICOMObjectBOverride 186, etc. COM Object B Inner Internals Object 162 can implement protected and override interfaces such as, for example, ICOMObjectBProtected 184 and/or ICOMObjectBOverride 182. It will be appreciated that overriding interfaces can be protected or public. A public overriding interface can be implemented by having the overriding interface on the regular object instead of on the internals object. For example, a public overriding interface would be placed on COM Object B 152 instead of on COM Object B Inner Internals Object 162.

Using this pattern of object creation a call by an application to an outer object's QueryInterface method to get any protected or protected override interface on the object will fail. For example, calling the QueryInterface method of ICOMObjectCInterface 166 for ICOMObjectBProtected 184 will fail. However, because an outer object has access to the internals object of the inner object, an outer object has access to the protected and/or protected override interfaces. For example, because COM Object C 150 has access to the inner internals object COM Object B Inner Internals Object 162 of COM Object B 152, COM Object C 150 can access any protected or protected override interfaces of COM Object B 152, such as ICOMObjectBProtected 184. COM Object C 150 has access to the inner internals object COM Object B Inner Internals Object 162 of COM Object B 152 because during creation of COM Object B 152, COM Object B 152 passed COM Object C 150 its ICOMObjectBProtected 184 interface. Thus, COM Object C 150 can access any protected and/or protected override interfaces of COM Object B 152. Moreover, each internal object can access the outermost or controlling internals object.

For example, suppose COM Object A 154 (innermost object) wants to access ICOMObjectAOverride. ICOMObjectAOverride may be implemented on COM Object C 150 and/or on COM Object B 152. COM Object A 154 can call QueryInterface on the controlling Internals object implemented by COM Object C Internals Object 160. If the ICOMObjectAOverride interface is implemented by COM Object C Internals Object 160, COM Object C's ICOMObjectAOverride 180 returns itself. If ICOMObjectAOverride is not implemented in COM Object C, the call to QueryInterface is delegated to the COM inner internals object implemented by COM Object B Internals Object 162, giving that object the opportunity to return its ICOMObjectBOverride 182 and so on. This is similarly true for COM Object B's override interfaces ICOMObjectBOverride 178 and ICOMObjectBOverride 186 and protected interfaces such as ICOMObjectBProtected 184 and the protected interface for COM Object A Inner Internal Object 164, ICOMObjectAProtected 188.

In accordance with aspects of the subject matter disclosed herein, an outer object's implementation of a method of an inner object's override interface can call an inner object's implementation (also referred to as "calling up to the base"). If the override interface is protected the outer object can call the inner object's implementation using the protected internal interface. If the override interface is public, the outer object can call the inner object's implementation using the standard non-delegating inner interface.

In the separation-of-interface approach, a separate object for the protected internals interface is not created and/or a separate object for the override internals interface is not created. Instead, in accordance with aspects of the subject matter disclosed herein, a new extension IUnknown interface is created which can be used to access these interfaces:

```
interface IInternalInterface : IUnknown
{
    QueryInternalInterface( REFIID riid, void **ppv );
};
```

When creating an inner object, a controlling internals interface (e.g., IInternalInterface) can be passed to the inner object, and an inner internals interface (e.g., IInternalInterface) can be returned. If an object is created but is not passed to the controlling internals interface (e.g, IInternalInterface), similarly no IInternalInterface is returned.

IInternalInterface::QueryInternalInterface can be queried for an object's protected interfaces. If an outer object is queried via its IInternalInterface::QueryInternalInterface method for an interface that it does not support, it forwards the query request to the inner object's IInternalInterface::QueryInternalInterface. QueryInternalInterface can be queried for any interface, but the object's QueryInterface cannot be queried for a protected interface. For example, COM ObjectC's QueryInterface and QueryInternalInterface can be queried for ICOM ObjectC, but only QueryInternalInterface can be queried for ICOMObjectBOverride. IInternalInterface::QueryInterface returns the public interface for IUnknown.

Figure 2A:
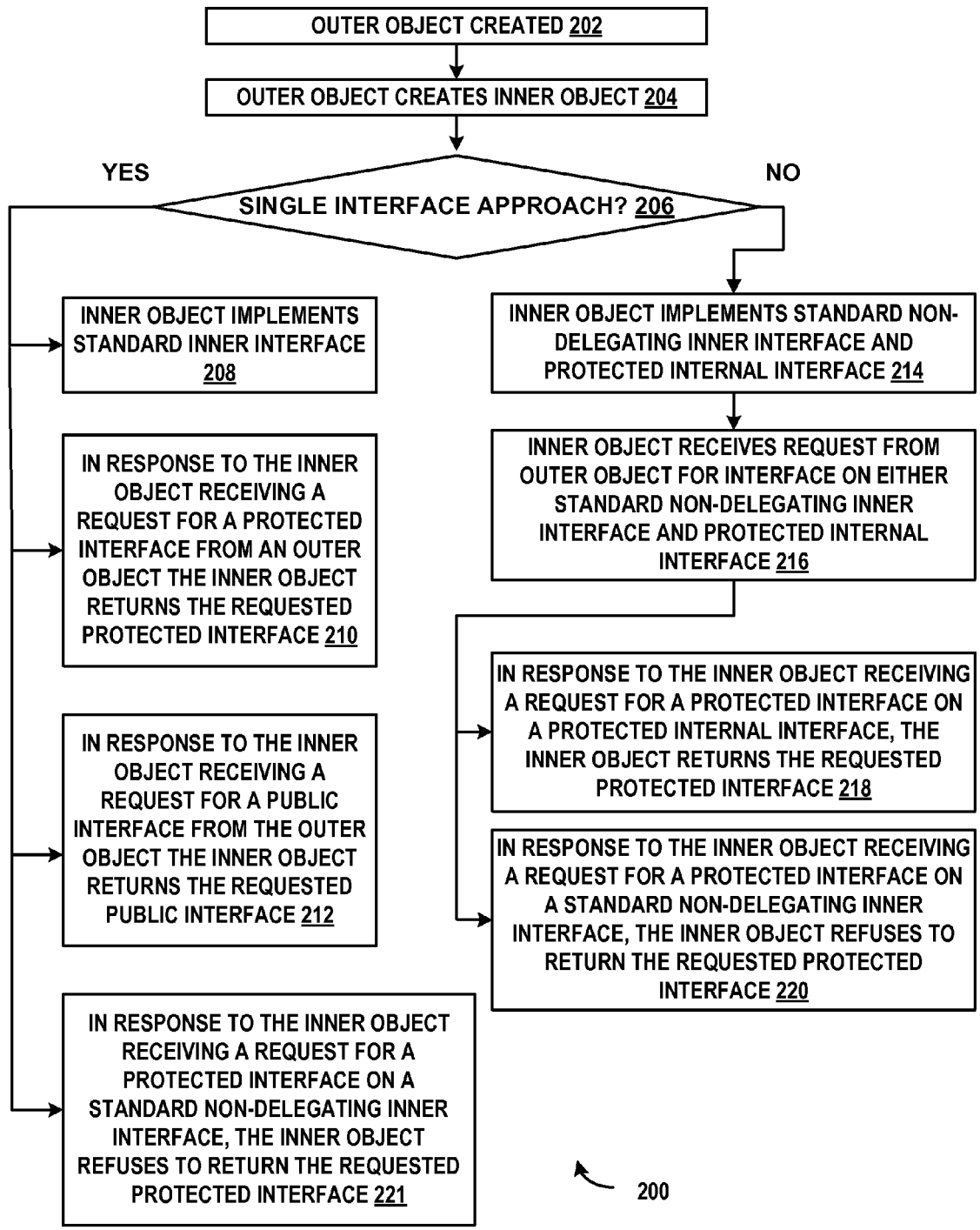
FIG. 2a is a flow diagram of an example of a method 200 for creating protected interfaces for COM aggregation on a computer in accordance with aspects of the subject matter disclosed herein.

FIG. 2a illustrates an example of a method 200 for creating protected interfaces for COM aggregation in accordance with aspects of the subject matter disclosed herein. The method described in FIG. 2a can be practiced by a system such as but not limited to the one described in FIG. 1a. Some of the actions described below can be optional. Some of the actions described below can be executed in a sequence that differs from that described below.

At 202 an outer object can be created. At 204, the outer object can create an inner object. If, at 206 a single interface approach is used, at 208, the inner object implements an extension to the standard inner interface. The extension to the standard inner interface can be used to request protected or public interfaces. When the outer object delegates an interface request from the controlling object's client, it makes a request for a public interface. At 210 in response to the inner object receiving a request for a public interface from an outer object, the inner object returns the requested public interface. At 212 in response to the inner object receiving a request for a protected interface from an outer object, the inner object returns the requested protected interface. At 221 in response to receiving a request for a protected interface using a standard inner interface, the inner object refuses to return the requested protected interface.

If a single interface approach is not used, at 214 the inner object implements a standard non-delegating inner interface and a protected internal interface. At 216 the inner object may receive a request from the outer object at the standard non-delegating inner interface at the protected internal interface. At 218 in response to the inner object receiving a request for a protected interface on the protected internal interface, the inner object returns the requested protected interface. At 220 in response to receiving a request for a protected interface using a standard inner interface, the inner object refuses to return the requested protected interface.

Figure 2B:
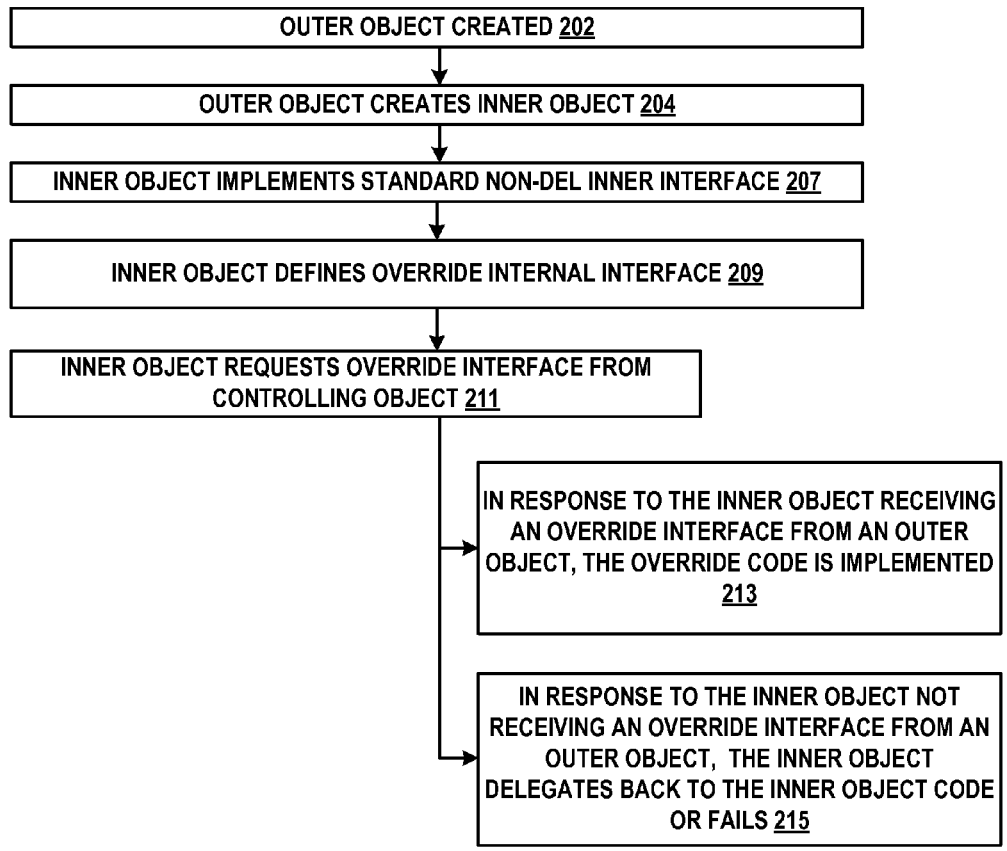
FIG. 2b is a flow diagram of an example of a method 201 for creating virtual or override interfaces for COM aggregation on a computer in accordance with aspects of the subject matter disclosed herein.

FIG. 2b illustrates an example of a method 201 for creating virtual or override interfaces for COM aggregation in accordance with aspects of the subject matter disclosed herein. The method described in FIG. 2b can be practiced by a system such as but not limited to the one described in FIG. 1a. Some of the actions described below can be optional. Some of the actions described below can be executed in a sequence that differs from that described below.

At 202 an outer object can be created. At 204, the outer object can create an inner object. At 207 the inner object can implement a standard non-delegating inner interface. At 209 the inner object can define an override internal interface. At 211 the inner object may request an override interface from the outermost (controlling) object. If the override interface is protected, the inner object requests the override interface using the internal protected interface. In the case of the single interface approach, the extension to the standard non-delegating inner interface is used. In the other case, the protected override interface for the controlling internals object is requested. If the override interface is public, the override interface is requested from the controlling object on the standard non-delegating inner interface, as described above. At 213 in response to receiving an override interface from an outer object, the inner object can invoke the override code. At 215, in response to the inner object failing to receive an override interface from an outer object, the inner object can delegate back to the inner object code or can fail.

Example of a Suitable Computing Environment

Figure 3:
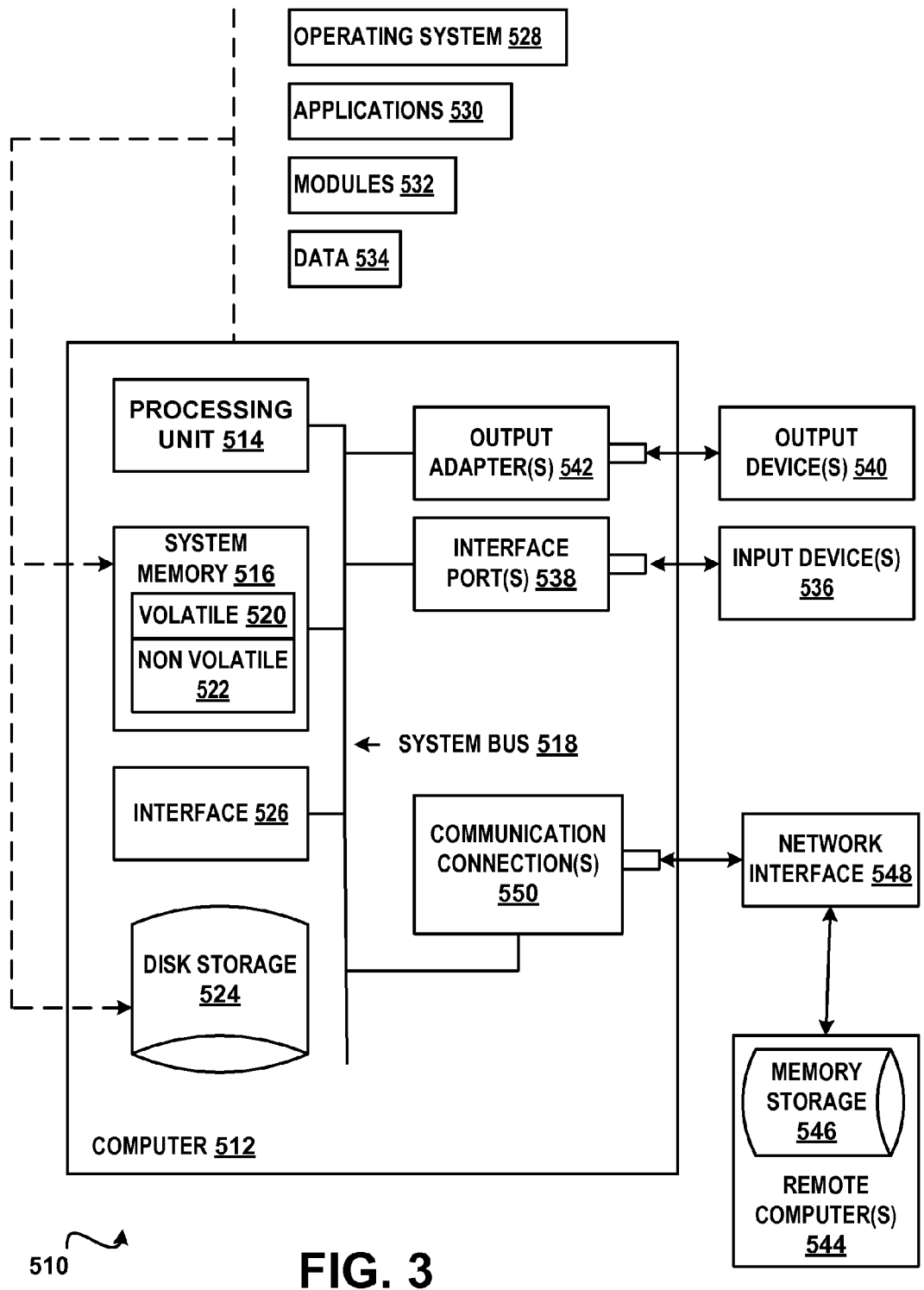
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can Object A (innermost object) and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
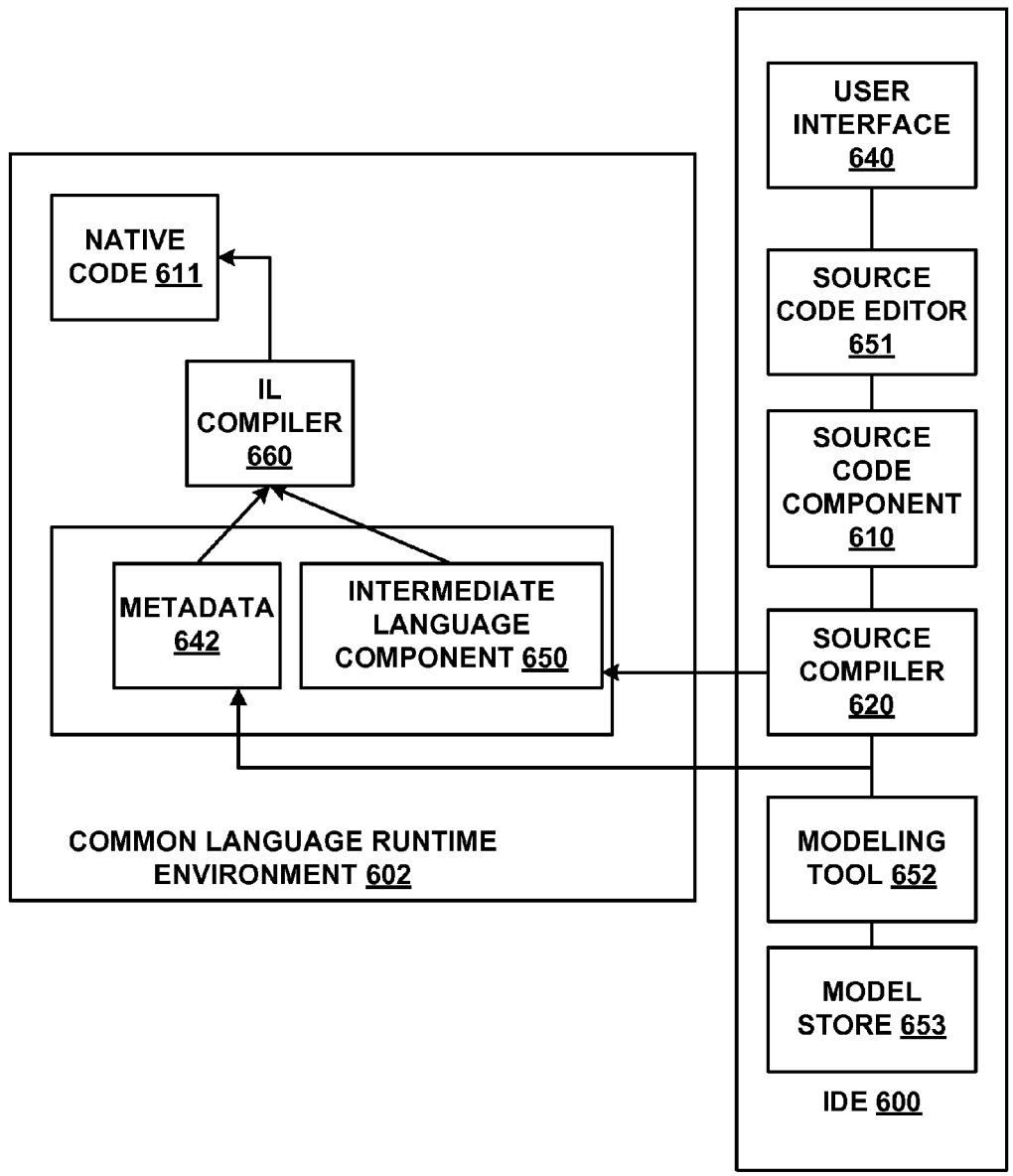
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, M L, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a processor and a memory of a computing device; and
a module on the computing device configured to cause the processor to:
create an outer COM object, the other COM object aggregating an inner COM object;
create the inner COM object;
pass the inner COM object a controlling unknown object from the outer COM object;
receive by the outer COM object a non-delegating unknown object from the inner COM object;
pass a controlling internals COM object from the outer COM object to the inner COM object;
return an inner internals COM object, said inner internals COM object capable of implementing a protected interface, from the inner COM object to the outer COM object; and
receive a request to create a protected interface for the inner COM object, the protected interface inaccessible to a calling application and the protected interface accessible to the outer COM object.

2. The system of claim 1, wherein the inner internals COM object implements the interface that provides access to protected content to the outer COM object.

3. The system of claim 1, wherein the outer internals COM object implements the interface accessible to the inner COM object that overrides behavior of the inner COM object.

4. The system of claim 1, wherein the outer COM object receives a private callback from the inner COM object.

5. The system of claim 1, wherein a call by the calling application to the outer COM object's QueryInterface method for the interface that provides access to protected content to the outer COM object fails.

6. The system of claim 1, wherein a call by an application to the outer COM object's QueryInterface method for the interface that provides access to override content to the outer COM object fails.

7. The system of claim 1, wherein the inner COM object is a first inner COM object and wherein the first inner COM object is the outer COM object to a second inner COM object.

8. The system of claim 1, wherein an outermost COM object is a controlling object.

9. The system of claim 1, wherein the outer COM object requests a protected interface of the inner COM object.

10. The system of claim 9, wherein the outer COM object receives a protected interface of the inner COM object and uses the protected interface of the inner COM object to invoke a subset of protected functionality of the inner COM object.

11. A method comprising:
receiving a request by a processor of a computer to create an outer COM object;

creating the outer COM object, the outer COM object aggregating an inner COM object;
creating the inner COM object;
passing the inner COM object a controlling unknown object from the outer COM object;
receiving by the outer COM object a non-delegating unknown object from the inner COM object;
receiving a request to create a protected interface for the inner COM object, the protected interface inaccessible to a calling application and the interface accessible to the outer COM object;
creating the protected interface for the inner COM object, the protected interface providing access to the outer COM object to protected content of the inner COM object and not providing access to the protected content to a calling application, wherein the protected interface comprises an extension to an IUnknown interface for the inner COM object.

12. The method of claim 11, wherein the extension IUnknown interface implements an interface that provides access to override content to the outer COM object.

13. The method of claim 11, wherein the inner COM object is a first inner COM object and wherein the first inner COM object is the outer COM object to a second inner COM object.

14. The method of claim 11, wherein the inner COM object provides the outer COM object private access to a subset of its functionality.

15. The method of claim 11, wherein the inner COM object provides the outer COM object access to a subset of functionality of the inner COM object, wherein the subset of functionality comprises protected override content.

16. The method of claim 11, wherein a separate object for the extension to the protected interface is not created.

17. A computer-readable storage medium comprising computer-executable instructions which when executed cause at least one processor to:
create an outer aggregating COM object;
create an inner COM object, the inner COM object aggregated by the outer aggregating COM object;
pass the inner COM object a controlling unknown object from the outer COM object;
receive by the outer COM object a non-delegating unknown object from the inner COM object;
receive a request to create a protected interface for the inner COM object, the interface inaccessible to a calling application and the interface accessible to the outer COM object;
receive a request using a standard interface request to create an override interface, the override interface accessible to a calling application and accessible to the outer COM object and in response:
create the override interface.

18. The computer-readable storage medium of claim 17, comprising further computer-executable instructions, which when executed cause the at least one processor to:
invoke override code in response to receiving the override interface from an outer COM object.

19. The computer-readable storage medium of claim 17, comprising further computer-executable instructions, which when executed cause the at least one processor to:
create a second inner COM object for the inner COM object, wherein the inner COM object is a first inner COM object.

20. The computer-readable storage medium of claim 17, comprising further computer-executable instructions, which when executed cause the at least one processor to:
delegating back to the inner COM object in a case in which the outer COM object does not implement the override interface or
failing in response to not receiving the override interface.

* * * * *